March 15, 1949.  M. BOCKMAN  2,464,551
AUTOMATIC REGULATOR USING TRANSDUCTORS
Filed Aug. 21, 1947
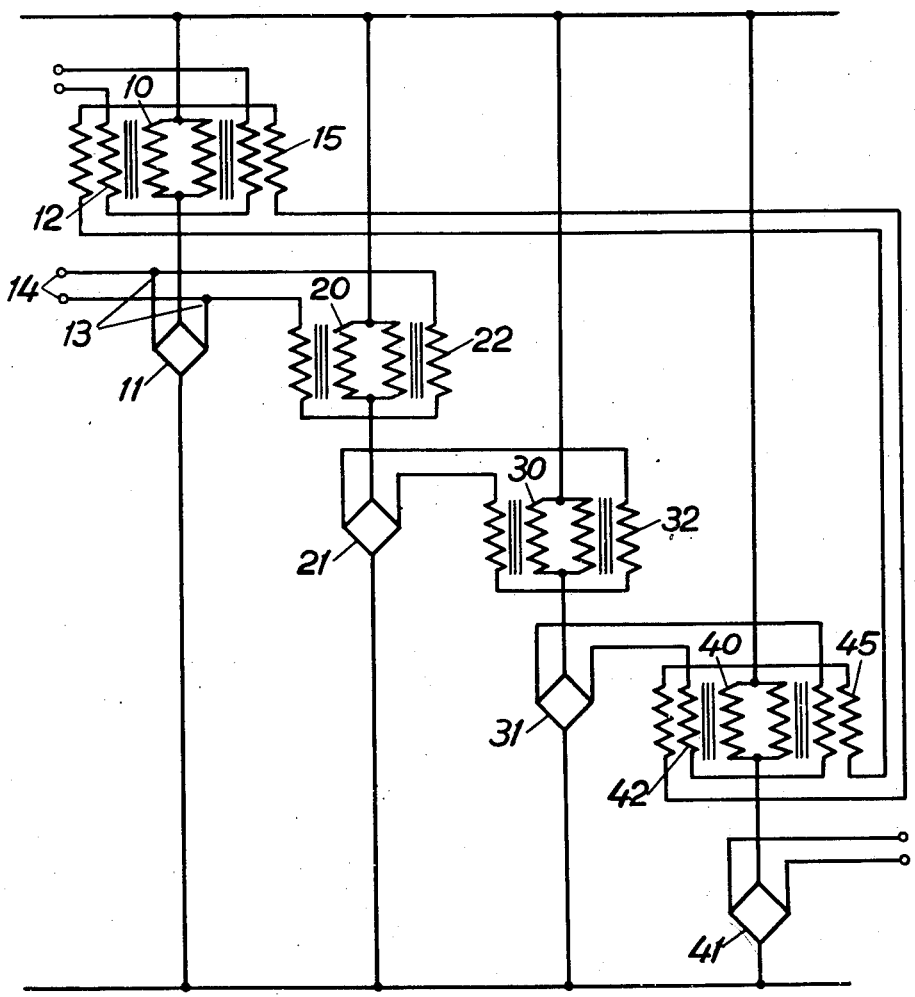
Inventor
Marius Böckman
By (signature) Attorney.

Patented Mar. 15, 1949

2,464,551

UNITED STATES PATENT OFFICE 2,464,551

AUTOMATIC REGULATOR USING TRANSDUCTORS

Marius Böckman, Ludvika, Sweden, assignor to Allmänna Svenska Elektriska Aktiebolaget, Vasteras, Sweden, a Swedish corporation Application August 21, 1947, Serial No. 769,881
In Sweden June 9, 1941

3 Claims. (Cl. 323—89)

Transductors, i. e., D. C. saturated inductances, have proved very useful for regulating, i. e., keeping constant, a technical quantity for the reason that they are able to provide a considerable amplification, i. e., a considerably higher value of the outgoing A. C. power than of the ingoing D. C. power. When a high degree of accuracy of the regulation is required, the primary power representing the difference between a standard quantity and the quantity to be regulated and which is here supposed to be of electrical nature as a rule is rather small, while it is generally necessary that the quantity effecting the regulation represents a rather high power. This can be accomplished without movable parts by means of one or more amplifying transductors.

Such a regulator with an electric differential quantity and amplifiers is in principle a directly acting regulator, as the quantity effecting the regulation is essentially proportional to the primary differential quantity or at any rate a definite value of the former quantity always corresponds to a definite value of the latter. This, however, only applies to stationary conditions. At the beginning of a procedure of regulation, the deviation of the regulated quantity from its normal value generally amounts to a much higher value than is permitted by the droop of the regulator in the stationary state. The quantity effecting the regulation then tends to reach a correspondingly high value, thus as a rule much higher than is required to keep the regulated quantity within the permitted limits in the stationary state. On account of the inertia of the amplifiers it takes, however, a comparatively long time before the quantity effecting the regulation can reach the said extreme value and thus during the major part of the regulating procedure, the said quantity rises with a more or less exact linearity, and the regulator thus will act practically as one of the indirect type. It has therefore also the tendency of an indirect regulator to provoke an overregulation and oscillations by the fact that the quantity effecting the regulation will continue to rise even after the regulated quantity has reached its normal value and thereby brought the differential quantity down to zero. For counteracting such a tendency it is common to provide an indirect regulator with a resilient compensation, i. e., a supplementary quantity which provides a temporary equilibrium between the regulated quantity and the normal quantity before the former one has reached its normal value and which then during the later portion of the regulating procedure again is reduced to nearly zero, so that the regulated quantity is restored to its normal value.

According to the present invention, such a resilient compensation is provided in a simple manner in regulators with amplifying direct current saturable reactors—hereinafter referred to as "transductors"—in such a way that a D. C. winding on one or more of the amplifying transductors sends an electrical impulse, which is subtracted from the electrical differential quantity measuring the deviation. Such an electrical impulse only lasts as long as the transductor has not reached its stationary state and therefore has the desirable transitory character.

The compensating impulse can be supplied to the primary regulator members in different manners. If the electrical differential quantity measuring the deviation for instance consists of a voltage, the compensating winding on the amplifying transductor may be connected in the voltage circuit, so that the voltage induced in the said winding is subtracted from the voltage measuring the deviation. If, on the other hand, the measuring differential quantity consists of a current, the current from the compensating winding can for instance be supplied to the points, from which the differential current is derived. If in using a regulating differential current the normal current is taken from a so-called constant current transductor, the compensating winding may feed a separate winding on the latter transductor, so that the normal current is temporarily reduced and the equilibrium thereby restored. Hereby a smaller power of the compensating impulse is required.

A form of the invention arranged in the last-mentioned manner is diagrammatically illustrated in the accompanying drawing.

In the drawing, 10 represents a so-called constant current transductor of a type known in principle, in which an A. C. winding connected between a pair of A. C. terminals in series with a rectifier 11 is normally kept constantly saturated by means of a D. C. winding 12, and therefore normally admits a substantially constant alternating current. The constant current in the D. C. winding 12 may in its turn be obtained in any known manner, for instance by means of a resistance strongly varying with the temperature or by means of two counteracting inductances, one constant and the other containing saturated iron.

The alternating current traversing the inductance 10 is rectified in the rectifier 11, and the constant direct current thus obtained represents the normal quantity of the regulator. It is, possibly afer being smoothened in a known manner, led to a pair of "Kirchhoff points" 13, to which also a current proportional to the quantity to be regulated is led over a couple of terminals 14. The difference between these two currents, which thus represents the deviation of the regulated quantity from its normal value, traverses a D. C. winding 22 on a transductor 20. This transductor essentially serves only as an amplifier, the alternating current traversing it being led, after being rectified in the rectifier 21, through a magnetising winding 32 on a transductor 30. The latter represents a further amplifying step, the alternating current traversing it being led, after rectifying in a rectifier 31, through the D. C. winding 42 of a transductor 40. The alternating current traversing the latter is supposed to possess a sufficient power for serving, either directly or after rectifying in a rectifier 41, as the quantity effecting the regulation, i. e., the restoring of the regulated quantity to its normal value. The amplifying transductors may of course be provided with self-fed D. C. windings in the usual manner.

Each one of the intermediary amplifiers has, however, a certain inertia (time constant), which causes the final regulating measure not to reach its full value until a certain time has elapsed after the deviation has given the impulse thereto by the winding 22. For eliminating the risk of oscillation caused hereby, it is, as well-known, customary to employ a compensation, i. e., a factor, which apparently and temporarily restores the equilibrium between the measuring quantity and the normal quantity before the regulated quantity has been restored to its normal value. In the form illustrated, this compensation is effected by means of an additional D. C. winding applied to one of the amplifying transductors, said winding acting either on the normal quantity or on the measuring quantity, so as to cause the aforesaid temperature restoration of the equilibrium. It is as a rule most convenient to cause the current to act on the normal quantity, which may be effected by means of an additional winding 15 on the constant current transductor, which winding is fed by an additional D. C. winding 45, for instance on the transductor 40. When the magnetising direct current in the winding 42 is raised (or lowered), a voltage is induced in the winding 45, which effects the compensation, but as soon as the current in the winding 42 has reached its final value, the said voltage ceases, whereby the compensation will be only temporary.

Instead of employing an additional D. C. winding it is also possible to cause one of the ordinary D. C. windings of the transductor to send the compensation impulse. In such a case it may be necessary to equilibrate in some way the influence on the compensating winding of the remaining D. C. voltage in the winding sending the impulse.

I claim as my invention:

1. An automatic regulator comprising a plurality of direct current saturable reactors operating in concatenation, a direct current winding applied to one of said reactors and traversed by a current representing the deviation of a regulated quantity from its normal value, a regulating member influenced by the current traversing another of said reactors representing a succeeding step in said concatenation, a direct current winding applied to one of said reactors, and connections through which the latter winding feeds back into a preceding reactor to compensate the inertia of the regulator.

2. An automatic regulator comprising a direct current saturable reactor having a direct current winding and a constant saturating current component, a second direct current saturable reactor, saturating means applied to the second reactor and influenced by the difference between the current traversing said first-named reactor and a current proportional to the quantity to be regulated, at least one direct current saturable reactor operating as an amplifier in concatenation with said second reactor, a regulating member influenced by the amplifying reactor, a direct current winding on one such amplifying reactor, and connections through which such amplifying reactor feeds back into the said direct current winding of the said first-named reactor.

3. An automatic regulator comprising a direct current saturable reactor having opposing saturating components which neutralize each other for a certain constant value of a quantity to be regulated, at least one direct current saturable reactor operating as an amplifier in concatenation with said first-named reactor, a regulating member influenced by said amplifying reactor, a direct current winding on one such amplifying reactor, and connections through which such amplifying reactor feeds back into a preceding reactor to compensate the inertia of the regulator.

MARIUS BÖCKMAN.

REFERENCES CITED

The following references are of record in the file of this patent:

UNITED STATES PATENTS

| Number | Name | Date |
|---|---|---|
| 2,027,311 | Fitzgerald | Jan. 7, 1936 |